United States Patent
Kim et al.

(10) Patent No.: US 11,318,781 B2
(45) Date of Patent: May 3, 2022

(54) VARIABLE AERODYNAMIC WHEEL AND CONTROL SYSTEM THEREOF

(71) Applicants: HYUNDAI MOTOR COMPANY, Seoul (KR); KIA MOTORS CORPORATION, Seoul (KR)

(72) Inventors: Un Tae Kim, Gwangmyeong-si (KR); Yong Su Shin, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 230 days.

(21) Appl. No.: 16/541,389

(22) Filed: Aug. 15, 2019

(65) Prior Publication Data
US 2020/0338924 A1    Oct. 29, 2020

(30) Foreign Application Priority Data

Apr. 23, 2019   (KR) .................. 10-2019-0047576

(51) Int. Cl.
*B60B 7/20*    (2006.01)
*B60B 19/00*   (2006.01)
*B60B 7/18*    (2006.01)

(52) U.S. Cl.
CPC .............. *B60B 7/20* (2013.01); *B60B 7/18* (2013.01); *B60B 19/00* (2013.01); *B60B 2900/1216* (2013.01)

(58) Field of Classification Search
CPC .......... B60B 19/00; B60B 19/10; B60B 7/18; B60B 7/20; B60B 7/0086; B60B 2900/1216; F16D 65/827; F16D 65/847
See application file for complete search history.

(56) References Cited

U.S. PATENT DOCUMENTS

| | | | | |
|---|---|---|---|---|
| 8,801,107 B2 * | 8/2014 | Schmid | ................ | F16D 65/847 |
| | | | | 301/37.107 |
| 9,469,155 B2 * | 10/2016 | Platto | ........................ | B60B 7/04 |
| 10,744,816 B2 * | 8/2020 | Bach | ........................ | B60B 7/06 |
| 2009/0195053 A1 * | 8/2009 | Kruse | .................... | B60B 19/10 |
| | | | | 301/6.4 |
| 2015/0069822 A1 * | 3/2015 | Haase | ....................... | B60B 1/06 |
| | | | | 301/37.101 |

(Continued)

FOREIGN PATENT DOCUMENTS

| | | | | | |
|---|---|---|---|---|---|
| CN | 110682728 A | * | 1/2020 | ............ | B60B 19/00 |
| CN | 112277528 A | * | 1/2021 | ............ | B60B 19/10 |

(Continued)

*Primary Examiner* — Jason R Bellinger (74) *Attorney, Agent, or Firm* — Morgan, Lewis & Bockius LLP (57) ABSTRACT

A variable aerodynamic wheel includes: a spoke wheel having a plurality of spokes connecting a hub and a rim together are spaced apart from each other, and a plurality of through spaces defined between the plurality of spokes to allow air to pass therethrough; a variable flap rotatably disposed in the plurality of through spaces of the spoke wheel, and configured in a shape to cover an associated through space so as to open or close the associated through space according to a rotation angle thereof; and a drive unit disposed in the spoke wheel, and connected to the variable flap such that the rotation angle of the variable flap is adjusted as rotational power is transmitted.

17 Claims, 9 Drawing Sheets

(56) References Cited

U.S. PATENT DOCUMENTS

| | | | |
|---|---|---|---|
| 2017/0043616 A1* | 2/2017 | Wippler | B60B 3/10 |
| 2017/0282643 A1* | 10/2017 | Hasegawa | B60T 5/00 |
| 2020/0062029 A1* | 2/2020 | Wong | B60B 7/04 |
| 2020/0223248 A1* | 7/2020 | Tsiberidis | B60B 7/04 |

FOREIGN PATENT DOCUMENTS

| | | | | |
|---|---|---|---|---|
| DE | 102014003394 A1 * | 9/2014 | | B60B 7/00 |
| FR | 3078286 A1 * | 8/2019 | | B60B 7/04 |
| KR | 10-2008-0053740 A | 6/2008 | | |
| KR | 10-2009-0063687 A | 6/2009 | | |
| KR | 101347172 B1 | 1/2014 | | |
| KR | 101522796 B1 | 5/2015 | | |
| KR | 10-2016-0022613 A | 3/2016 | | |
| KR | 10-2018-0061847 A | 6/2018 | | |
| KR | 10-2020-0005289 A | 1/2020 | | |

* cited by examiner

VARIABLE AERODYNAMIC WHEEL AND CONTROL SYSTEM THEREOF

CROSS REFERENCE TO RELATED APPLICATION

The present application claims priority to Korean Patent Application No. 10-2019-0047576, filed on Apr. 23, 2019 in the Korean Intellectual Property Office, the entire contents of which is incorporated herein for all purposes by this reference.

TECHNICAL FIELD

The present disclosure relates to a variable aerodynamic wheel and a control system thereof, capable of reducing air resistance generated in the wheel and adjusting drag and lift according to driving conditions, thereby improving aerodynamic performance.

BACKGROUND

In general, a vehicle has a streamlined external shape so as to reduce air resistance, thus improving aerodynamic performance, the vehicle. However, the air resistance acting on the vehicle includes not only the upper resistance according to the external shape of the vehicle but also the lower resistance generated from the wheel and tire region. Accordingly, the air resistance of the wheel and tire region needs to be improved as well.

In particular, since wheels and tires are components that rotate at high speed and have a great impact on brake/aerodynamic performance as well as on design sensibility, design optimization of the wheel shape is complicated. In other words, in order to satisfy various performances of a wheel, beyond simply reducing the opening ratio and curvature of the wheel, a technique has been developed a variable mechanism inside the wheel to deform the wheel shape as necessary by using elastic force and inertia force.

However, conventionally, air flow is improved by only considering the air flow in a one-dimensional resistance around the wheel, so the drag reduction effect is extremely limited. Further, in the case of a structure using an elastic force, a spring is deformed by the heat generated from a brake, so that durability is deteriorated and aerodynamic performance may not be maintained.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art. The present disclosure is intended to propose a variable aerodynamic wheel and a control system thereof, in which a variable flap is applied between spokes of a wheel, so that air can be sucked or blown depending on the angle of the variable flap, whereby air resistance is reduced and also the shape of wake flowing on a vehicle body is optimized, so drag and lift are improved, and thus driving performance and fuel efficiency are improved.

In order to achieve the above object, according to an exemplary embodiment of the present disclosure, a variable aerodynamic wheel includes: a spoke wheel having a plurality of spokes connecting a hub and a rim together and spaced apart from each other, and including a plurality of through spaces defined between the plurality of spokes to allow air to pass therethrough; a variable flap rotatably disposed in the plurality of through spaces of the spoke wheel, and having a shape to cover an associated through space so as to open or close the associated through space according to a rotation angle thereof; and a drive unit disposed in the spoke wheel, and connected to the variable flap such that the rotation angle of the variable flap is adjusted as rotational power is transmitted.

The variable flap may include fixing pins at first and second ends thereof, respectively, wherein the fixing pin at the first end is rotatably connected to the rim and the fixing pin at the second end is rotatably connected to the hub.

The drive unit may include: a rotary motor provided in the hub, and provided with a drive gear for transmitting the rotational power; a ring gear provided to be rotatable about a center of the hub, formed to extend in a circumferential direction of the hub, and engaged with the drive gear; and a transmission gear coupled to the variable flap, and engaged with the ring gear to be rotated along with the variable flap when the ring gear is rotated, thereby changing the rotation angle of the variable flap.

The variable aerodynamic wheel may further include a power-generation cover unit provided in the hub of the spoke wheel to cover the drive unit, wherein power-generation cover unit includes: a power-generating cover formed in a plate shape to cover the drive unit, fixedly mounted to the hub, and constituted by a thermoelectric device that generates electrical energy using heat; and a battery provided in the hub, and configured to store the electrical energy generated from the power-generating cover.

According to another exemplary embodiment of the present disclosure, a control system of a variable aerodynamic wheel includes: a spoke wheel disposed in each of front and rear wheels, having a plurality of spokes connecting a hub and a rim together and spaced apart from each other, and including a plurality of through spaces defined between the plurality of spokes to allow air to pass therethrough; a variable flap rotatably disposed in the plurality of through spaces of the spoke wheel, and having a shape to cover an associated through space so as to open or close the associated through space according to a rotation angle thereof; a drive unit disposed in the spoke wheel, and connected to the variable flap such that the rotation angle of the variable flap is adjusted as rotational power is transmitted; and a controller receiving driving speed information and controlling the drive unit to adjust the rotation angle of the variable flap and a rotating direction of the variable flap according to a driving speed of a vehicle.

The rotating direction of the variable flap preset in the controller may be set to a first direction to allow air to be sucked into the through space during rotation of the spoke wheel, and a second direction to allow air to be blown.

When the driving speed of the vehicle is within a predetermined low speed range, the controller may control the drive unit to adjust the rotation angle of the variable flap such that the variable flaps of the front and rear wheels fully open the through spaces.

The controller may receive information according to a driving mode of the vehicle, and when the driving speed of the vehicle is within a predetermined high speed range, the controller may control the drive unit to adjust the rotation angles of the variable flaps of the front and rear wheels, wherein the rotation angles of the variable flaps are controlled such that the variable flaps of the front and rear wheels are rotated in the first direction or in the second direction to fully close the through spaces or to partially open the through spaces according to the driving mode of the vehicle.

When the driving mode is a normal mode, the controller may adjust the rotation angles of the variable flaps such that the variable flaps of the front and rear wheels fully close the through spaces.

When the driving mode is an eco mode, the controller may adjust the rotation angles of the variable flaps such that the variable flaps of the front and rear wheels have a first predetermined angle toward the first direction.

The first predetermined angle of the controller may be set differently according to a plurality of driving speed ranges such that the rotation angle of the variable flap is gradually decreased as the driving speed is increased.

The controller may receive information according to whether the vehicle is turning or not, and during straight driving with the driving mode being a sports mode, the controller may control such that the variable flaps of the front wheels are oriented to the second direction, the variable flaps of the rear wheels are oriented to the first direction, and the rotation angles of all the variable flaps are adjusted to a second predetermined angle.

The second predetermined angle of the controller may be set differently according to a plurality of driving speed ranges such that the rotation angle of the variable flap is gradually decreased as the driving speed is increased.

During turning with the driving mode being a sports mode, the controller may be configured such that the rotating direction of the variable flap corresponding to each of a left front wheel, a right front wheel, a left rear wheel, and a right rear wheel is changed according to a plurality of driving speed ranges and turning directions.

When the driving speed is in a predetermined first speed range and the vehicle is turning left in the sports mode, the controller may control such that the variable flap of the left front wheel and the variable flap of the right rear wheel are oriented to the first direction, the variable flap of the right front wheel and the variable flap of the left rear wheel are oriented to the second direction, and the rotation angles of all the variable flaps are adjusted to a third predetermined angle, and during right turn, each of the variable flaps is adjusted to be rotated in a direction opposite to left turn.

When the driving speed is in a second speed range higher than the first speed range and the vehicle is turning left in the sports mode, the controller may control such that the left front wheel, the left rear wheel, and the right rear wheel are oriented to the first direction, the right front wheel is oriented to the second direction, and the rotation angles of all the variable flaps are adjusted to the third predetermined angle, and during right turn, each of the variable flaps is adjusted to be rotated in a direction opposite to left turn.

When the driving speed is in a third speed range higher than the second speed range and the vehicle is turning left in the sports mode, the controller may control such that the variable flap of the left front wheel and the variable flap of the left rear wheel are oriented to the first direction, the variable flap of the right front wheel and the variable flap of the right rear wheel are oriented to the second direction, and the rotation angles of all the variable flaps are adjusted to the third predetermined angle, and during right turn, each of the variable flaps is adjusted to be rotated in a direction opposite to left turn.

According to the variable aerodynamic wheel and the control system thereof configured as described above, the variable flap is applied between spokes of a wheel, so that air can be sucked or blown depending on the angle of the variable flap, whereby air resistance is reduced and also the shape of wake flowing on a vehicle body is optimized, so drag and lift are improved, and thus driving performance and fuel efficiency are improved.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinbelow, a variable aerodynamic wheel and a control system thereof according to an exemplary embodiment of the present disclosure will be described in detail with reference to the accompanying drawings.

Figure 1:
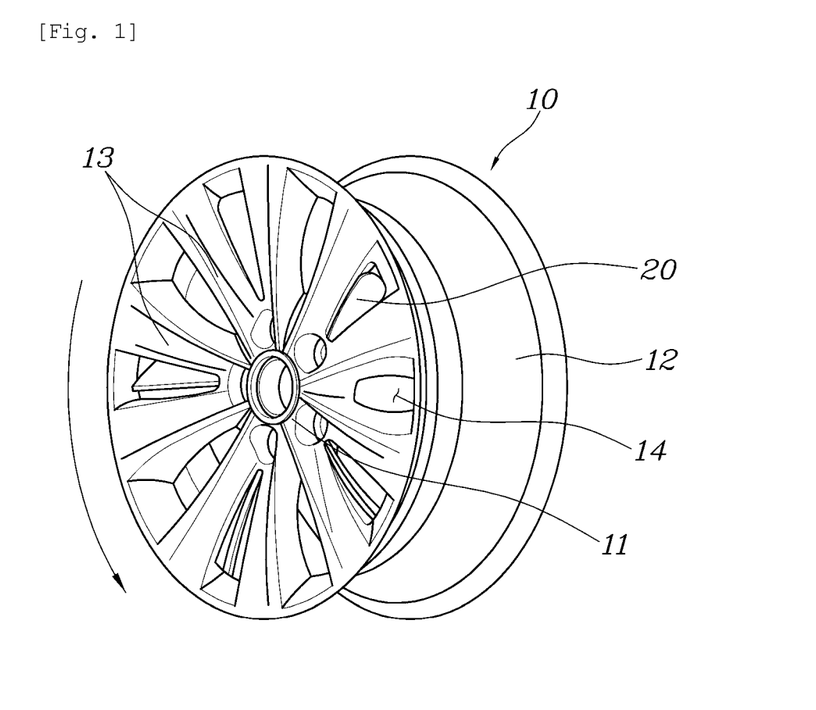
FIG. 1 is a view showing a variable aerodynamic wheel according to an exemplary embodiment of the present disclosure.
Figure 2:
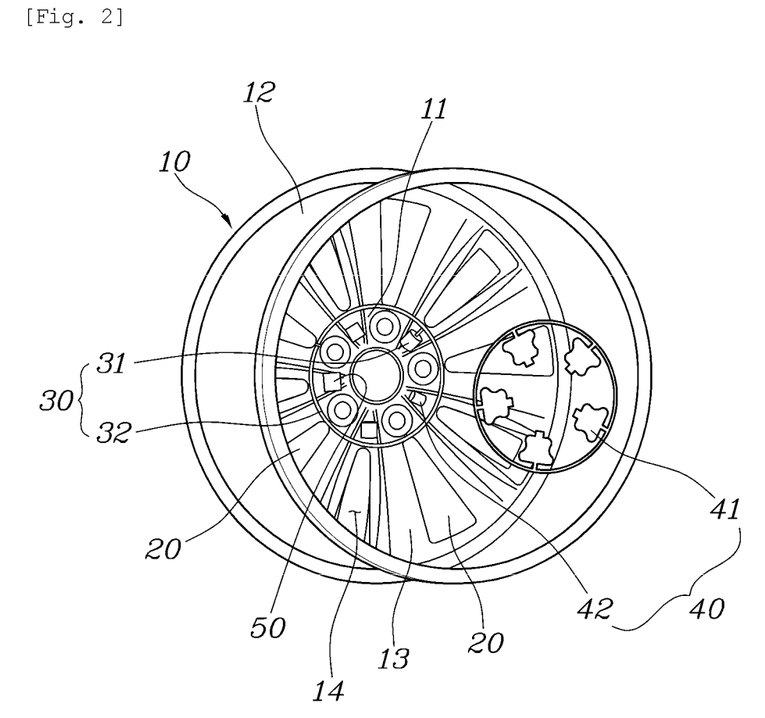
FIG. 2 is a view showing components of the variable aerodynamic wheel shown in FIG. 1.
Figure 3:
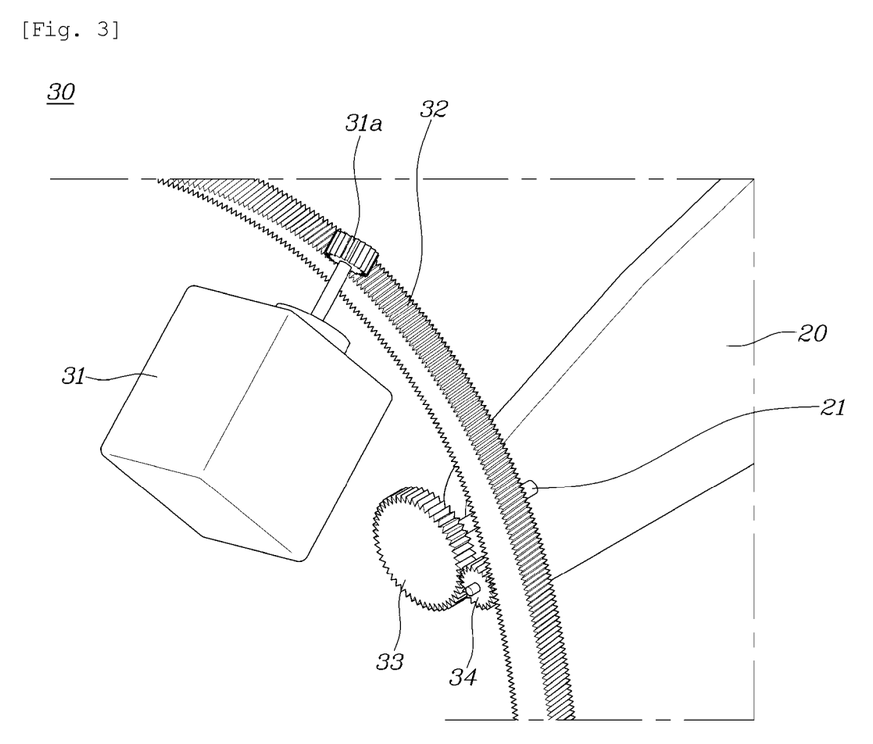
FIG. 3 is a view showing an operational structure of a variable flap of the variable aerodynamic wheel shown in FIG. 1, FIGS. 4 to 6 are views showing exemplary embodiments according to a rotational position of the variable flap of the variable aerodynamic wheel shown in FIG. 1, and FIGS. 7 to 9 are control flowcharts of a control system of the variable aerodynamic wheel according to the present disclosure.

FIG. 1 is a view showing a variable aerodynamic wheel according to an exemplary embodiment of the present disclosure, FIG. 2 is a view showing components of the variable aerodynamic wheel shown in FIG. 1, FIG. 3 is a view showing an operational structure of a variable flap of the variable aerodynamic wheel shown in FIG. 1, FIGS. 4 to 6 are views showing exemplary embodiments according to a rotational position of the variable flap of the variable aerodynamic wheel shown in FIG. 1, and FIGS. 7 to 9 are control flowcharts of a control system of the variable aerodynamic wheel according to the present disclosure.

A variable aerodynamic wheel according to the present disclosure, as shown in FIGS. 1 to 3, includes: a spoke wheel 10 configured such that a plurality of spokes 13 connecting a hub 11 and a rim 12 together are arranged while being spaced apart from each other, with a plurality of through spaces 14 defined between the plurality of spokes 13 to allow air to pass therethrough; a variable flap 20 rotatably provided in the plurality of through spaces 14 of the spoke wheel 10, and configured in a shape to cover an associated through space 14 so as to open or close the through space 14 according to a rotation angle thereof; and a drive unit 30 provided in the spoke wheel 10, and connected to the variable flap 20 such that the rotation angle of the variable flap 20 is adjusted as rotational power is transmitted.

The spoke wheel 10 of the present disclosure includes the hub 11 forming the center portion, and the rim 12 to which a tire is mounted, wherein the hub 11 and the rim 12 are connected through the plurality of spokes 13. Herein, the plurality of spokes 13 are arranged spaced apart from each other about the hub 11 to form the through spaces 14, and the variable flap 20 is rotatably provided in the through spaces 14 so as to open or close the through space 14 according to the rotation angle thereof. The variable flap 20 may be provided in all of the plurality of through spaces 14 or in some of the through spaces 14, may be formed to match with the through spaces 14, or may be configured such that first and second ends thereof are provided with respective fixing pins 21, so the fixing pin 21 at the first end is rotatably connected to the rim 12 and the fixing pin 21 at the second end is rotatably connected to the hub 11. Accordingly, the variable flap 20 can be rotated in a direction corresponding to the rotating direction of the spoke wheel 10.

The variable flap 20 receives the rotational power through the drive unit 30 provided in the spoke wheel 10 and the rotation angle thereof is changed, thereby adjusting aerodynamics applied to the spoke wheel 10. Herein, the drive unit 30 may include: a rotary motor 31 provided in the hub 11, and provided with a drive gear 31a for transmitting the rotational power; a ring gear 32 provided to be rotatable about a center of the hub 11, formed to extend in a circumferential direction of the hub 11, and engaged with the drive gear 31a; and a transmission gear 33 coupled to the variable flap 20, and engaged with the ring gear 32 to be rotated along with the variable flap 20 when the ring gear 32 is rotated, thereby changing the rotation angle of the variable flap 20.

The rotary motor 31 may be a step motor, wherein the drive gear 31a is rotated by the rotational power of the rotary motor 31. The ring gear 32 is engaged with the drive gear 31a, and the ring gear 32 is formed to extend in the circumferential direction of the hub 11 so as to be rotated about the center of the hub 11 during rotation. Herein, the hub 11 of the spoke wheel 10 may have a mounting space for allowing the ring gear 32 to be provided therein. Since the ring gear 32 is engaged with the transmission gear 33 coupled to the variable flap 20, the ring gear 32 is rotated about the center of the hub 11 as the drive gear 31a is rotated during operation of the rotary motor 31, and the variable flap 20 is rotated along with the transmission gear 33 as the transmission gear 33 engaged with the ring gear 32 is rotated, and thus, the rotation angle of the variable flap 20 is adjusted. Herein, a connecting gear 34 for adjusting a gear ratio may be provided between the ring gear 32 and the transmission gear 33.

As such, since the variable flap 20 is applied to between the spokes 13 of the spoke wheel 10, and the rotation angle of the variable flap 20 is adjusted by the drive unit 30, it is possible to improve air flow and to reduce air resistance by controlling the flow of air according to driving conditions.

Referring to FIG. 2, the variable aerodynamic wheel further includes a power-generation cover unit 40 provided in the hub 11 of the spoke wheel 10 to cover the drive unit 30. The power-generation cover unit 40 may include: a power-generating cover 41 formed in a plate shape to cover the drive unit 30, fixedly mounted to the hub 11, and constituted by a thermoelectric device that generates electrical energy using heat; and a battery 42 provided in the hub 11, and configured to store the electrical energy generated from the power-generating cover 41.

Herein, as the power-generating cover 41 is formed in a shape to cover the drive unit 30 and is mounted to the hub 11, it is possible to protect the drive unit 30 from external contamination; and since the power-generating cover is made of a thermoelectric material, it is possible to generate electrical energy by using heat energy generated from a brake pad when a vehicle is braked. The electrical energy generated from the power-generating cover 41 can be stored via the battery 42 and be supplied to the vehicle's electric and electronic parts.

The variable aerodynamic wheel of the present disclosure can change the rotation angle depending on driving conditions. A control system of a variable aerodynamic wheel includes: a spoke wheel 10 provided as each of front and rear wheels, and configured such that a plurality of spokes 13 connecting a hub 11 and a rim 12 together are arranged while being spaced apart from each other, and having a plurality of through spaces 14 defined between the plurality of spokes 13 to allow air to pass therethrough; a variable flap 20 rotatably provided in the plurality of through spaces 14 of the spoke wheel 10, and configured in a shape to cover an associated through space 14 so as to open or close the through space 14 according to a rotation angle thereof; a drive unit 30 provided in the spoke wheel 10, and connected to the variable flap 20 such that the rotation angle of the variable flap 20 is adjusted as rotational power is transmitted; and a controller 50 receiving driving speed information and controlling the drive unit 30 to adjust the rotation angle of the variable flap 20 and a rotating direction of the variable flap 20 according to the driving speed of a vehicle. Herein, the controller 50 may receive the driving speed information through a speed sensor.

Herein, the controller 50 may be hardware such as a processor (e.g, Electronic Control Unit (ECU) or Micro Control Unit (MCU)), may be software executed by the hardware, or may be the aggregation from combining the hardware and the software.

In other words, the drive unit 30 that adjusts the rotation angle of the variable flap 20 is controlled by the controller 50, and the controller 50 adjusts the rotation angle of the variable flap 20 and the rotating direction of the variable flap 20 according to the driving speed, whereby depending on the rotational position of the variable flap 20. In this case, air may be sucked into the through space 14 of the spoke wheel 10 or blown outside the spoke wheel 10 so as to form an air flow stream that is optimized for driving conditions. As a result, the drag and lift according to the air flow generated from the spoke wheel 10 can be improved, thereby improving the driving performance and the fuel efficiency.

Figure 7:
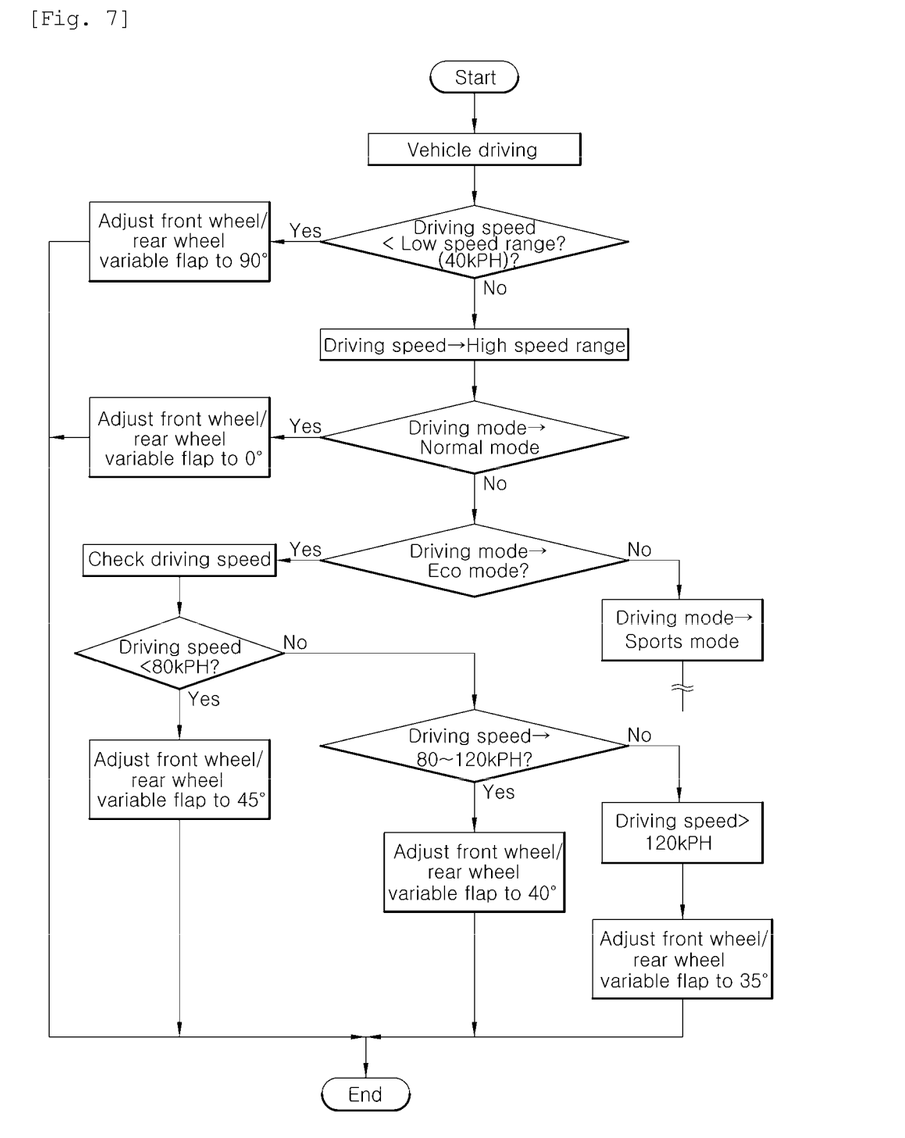
Figure 8:
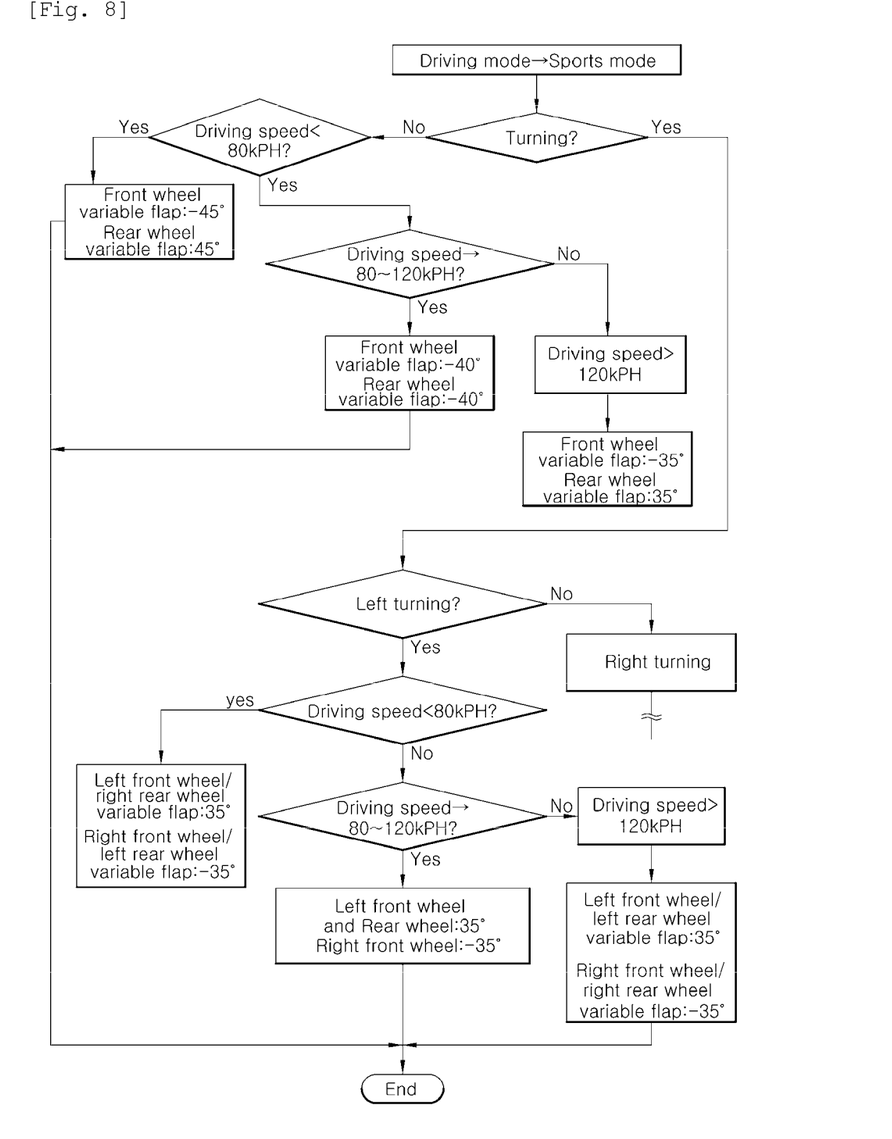
Figure 9:
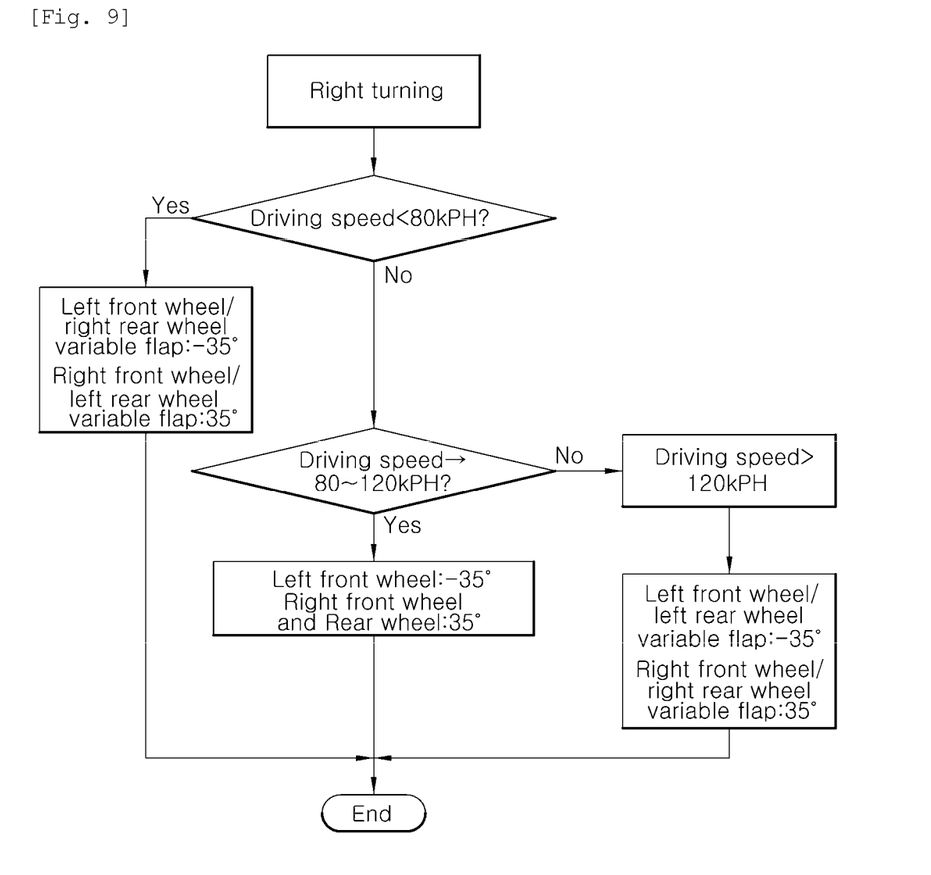

To be more specific, referring to FIGS. 7 to 9, the rotating direction of the variable flap 20 preset in the controller 50 may be set to a first direction to allow air to be sucked into the through space 14 during rotation of the spoke wheel 10 and a second direction to allow air to be blown.

Figure 4:
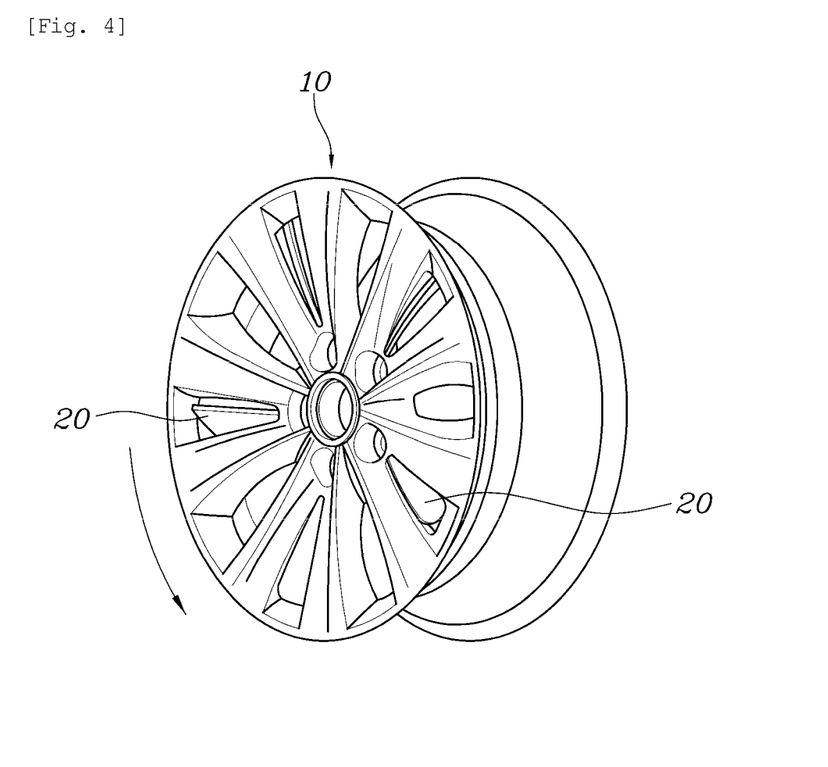

In the present disclosure, the air flow stream may be changed depending on the rotational position of the variable flap 20 according to the rotating direction. In other words, as shown in FIG. 1, the first direction of the variable flap 20 preset in the controller 50 is a direction in which the variable flap 20 is positioned to allow air to be sucked into the through space 14 with respect to the rotating direction of the spoke wheel 10. Further, as shown in FIG. 4, the second direction of the variable flap 20 is a direction in which the variable flap 20 is positioned to allow air to be discharged through the through space 14 with respect to the rotating direction of the spoke wheel 10.

As such, when the variable flap 20 is rotated in the first direction, drag performance can be improved, and when the variable flap 20 is rotated in the second direction, lift performance can be improved. Thus, by adjusting the rotational positions of the variable flaps 20 of front and rear wheels to the first direction or to the second direction according to the driving conditions, it is possible to secure aerodynamic performance optimized for various driving conditions of the vehicle.

As seen from the following experiment chart, it is possible to secure optimized aerodynamic performance according to driving conditions by referring to change in aerodynamic performance according to the rotational direction positions of the variable flaps 20 of the front wheels and the variable flaps 20 of the rear wheels.

| SECTION | BASE | FRT SUCTION RR SUCTION | FRT DISCHARGE RR SUCTION | FRT SUCTION RR DISCHARGE | FRT DISCHARGE RR DISCHARGE |
|---|---|---|---|---|---|
| $C_D$ | 0.319 | 0.305 | 0.313 | 0.342 | 0.348 |
| $C_{LF}$ | 0.053 | 0.035 | −0.010 | 0.045 | −0.001 |
| $C_{LR}$ | 0.075 | 0.057 | 0.026 | 0.051 | 0.032 |

To be specific, the controller 50 may control the drive unit 30 to adjust the rotation angle of the variable flap 20 so that the variable flaps 20 of the front and rear wheels fully open the through spaces 14 when the driving speed of the vehicle is within a predetermined low speed range.

Figure 5:
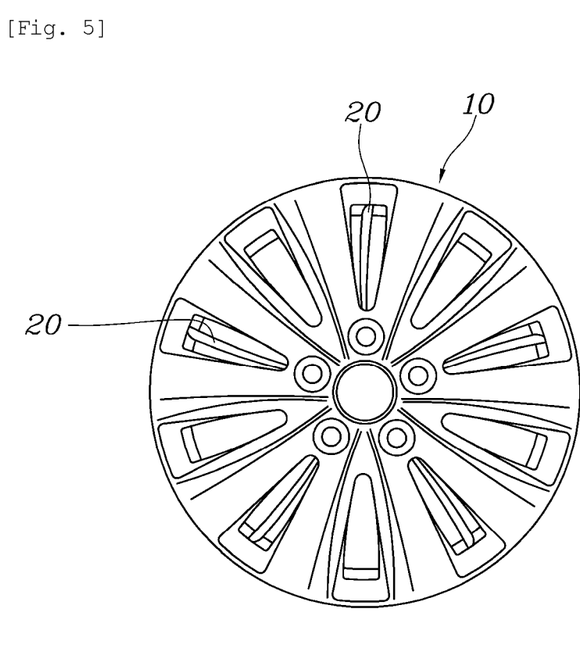

Herein, the low speed range may be set at a speed of less than 40 KPH, and may be variously set depending on the vehicle. In other words, when the driving speed of the vehicle is within the low speed range, the controller 50 allows the variable flaps 20 of the front and rear wheels to fully open the through spaces 14 as shown in FIG. 5 so that the design effect is secured rather than improvement in aerodynamic performance, thereby maximizing design sensitivity of the spoke wheel 10.

The controller 50 receives information according to a driving mode of the vehicle, and when the driving speed of the vehicle is within a predetermined high speed range, the controller controls the drive unit 30 to adjust the rotation angles of the variable flaps 20 of the front and rear wheels, wherein the rotation angle of the variable flap 20 may be controlled such that the variable flaps 20 of the front and rear wheels are rotated in the first direction or in the second direction to fully close the through spaces 14 or to partially open the through spaces 14 according to the driving mode of the vehicle. In terms of the driving mode provided to the controller 50, information about the driving mode may be obtained through a button operation reflecting the driver's will.

Herein, the driving mode may include: a normal mode determining the conditions such as the pedal effort and the speed range provided to a user's pedal so as to allow a comfortable driving at low speed and more responsive driving at high speed; an eco mode configured to maximize fuel economy, by controlling shift timing while suppressing the spike in engine rotation; and a sports mode in which shift-up timing is delayed or shift is performed at the rotation speed at which the maximum torque is generated.

Further, the high speed range may be set at a speed of 40 KPH or more, and may be variously set depending on the vehicle.

In other words, when the driving speed of the vehicle enters the high speed range, the controller 50 adjusts the opening amount of the variable flaps 20 of the front and rear wheels according to the driving mode of the vehicle so that the aerodynamic performance is optimized according to the driving mode.

To be specific, when the driving mode is the normal mode, the controller 50 may adjust the rotation angle of the variable flap 20 such that the variable flaps 20 of the front and rear wheels fully close the through spaces 14.

Figure 6:
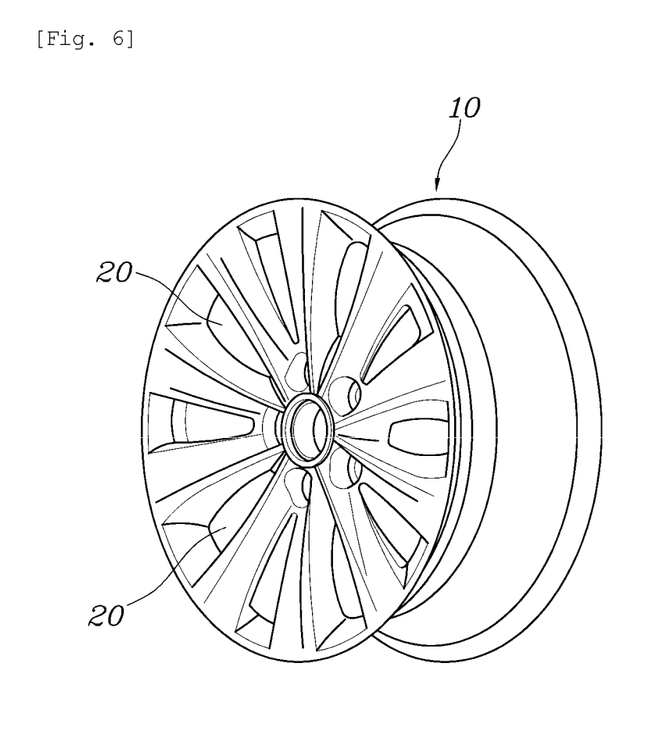

In other words, when the driving mode is the normal mode, as shown in FIG. 6, the variable flap 20 is controlled to fully close the through space 14, thereby reducing driving noise generated from the wheel. In other words, since comfortable driving sensibility is important in the normal mode, the variable flap 20 closes the through space 14 to reduce noise due to the air flow toward the spoke wheel 10.

When the driving mode is the eco mode, the controller 50 may adjust the rotation angle of the variable flap 20 such that the variable flaps 20 of the front and rear wheels to a first predetermined angle toward the first direction.

Herein, the first predetermined angle may be set at an angle of about 45% and may be variously set depending on the aerodynamic performance of the vehicle. Further, the first predetermined angle of the controller 50 may be set differently according to a plurality of driving speed ranges so that the rotation angle of the variable flap 20 is gradually decreased as the driving speed is increased. In other words, since the rotational speed of the wheel is increased according to the driving speed of the vehicle, the rotation angle of the variable flap 20 is set to be large in the low speed range to secure the air volume, and the rotation angle of the variable flap is set to be small in the high speed range to prevent the variable flap 20 from being damaged due to excessive wind pressure.

For example, in the speed range of 40 to 80 KPH, the first predetermined angle formed by each of the variable flaps 20 of the front and rear wheels may be set to an angle of 45°; in the speed range of 80 to 120 KPH, the first predetermined angle formed by each of the variable flaps 20 of the front and rear wheels may be decreased to an angle of 40°; and in the speed range of 120 to 160 KPH or more, the first predetermined angle formed by each of the variable flaps 20 of the front and rear wheels may be decreased to an angle of 35°.

Thus, when the driving mode is the eco mode, as all the variable flaps 20 of the front and rear wheels are rotated by the first predetermined angle in the first direction, a suction flow in which air passes through the through space 14 of the spoke wheel 10 is created, thereby minimizing drag. As a result, when the eco mode is set in the high speed range, an airflow stream with optimized fuel efficiency is created, and the rotation angle of the variable flap 20 is adjusted according to the driving speed, thereby preventing damage to the variable flap 20.

The controller 50 may receive information according to whether the vehicle is turning or not, and during straight driving with the driving mode being the sports mode the controller may control such that the variable flaps 20 of the front wheels are oriented to the second direction, the variable flaps 20 of the rear wheels are oriented to the first direction, and the rotation angles of all the variable flaps 20 are adjusted to a second predetermined angle. Herein, whether or not the vehicle is turning may be obtained by collecting turning information through a steering wheel sensor of the vehicle.

As such, in the high speed range, during straight driving with the driving mode being the sports mode without performing turning, the controller 50 adjusts the rotation angle of the variable flap 20 of the front wheel to the second direction so as to form the blowing flow of air, and adjusts the rotation angle of the variable flap 20 of the rear wheel to the first direction so as to form the suction flow of air.

Herein, the second predetermined angle may be set at an angle of 45° in the first direction and set at an angle of −45' in the second direction, and may be variously set depending on the aerodynamic performance of the vehicle. Further, the second predetermined angle of the controller 50 may be set differently according to a plurality of driving speed ranges so that the rotation angle of the variable flap 20 is gradually decreased as the driving speed is increased. In other words; since the rotational speed of the wheel is increased according to the driving speed of the vehicle, the rotation angle of the variable flap is set to be small to prevent the variable flap 20 from being damaged due to excessive wind pressure when the driving speed of the vehicle is increased.

For example, in the speed range of 40 to 80 KPH, the second predetermined angle of the variable flap 20 of the front wheel may be set to an angle of −45°, and the second predetermined angle of the variable flap 20 of the rear wheel may be set to an angle of 45°; in the speed range of 80 to 120 KPH, the second predetermined angle of the variable flap 20 of the front wheel may be set to an angle of −40°, and the second predetermined angle of the variable flap 20 of the rear wheel may be set to an angle of 40°; and in the speed range of 120 to 160 KPH or more, the second predetermined angle of the variable flap 20 of the front wheel may be set to an angle of −35% and the second predetermined angle of the variable flap 20 of the rear wheel may be set to an angle of 35°.

Thus, during straight driving with the driving mode being the sports mode, blowing flow of air is generated at the front wheel and suction flow of air is generated at the rear wheel, so that an air flow stream optimized for high speed driving can be generated.

During turning with the driving mode being the sports mode, the controller 50 may be configured such that the rotating direction of the variable flap 20 corresponding to each of a left front wheel, a right front wheel, a left rear wheel, and a right rear wheel is changed according to the plurality of driving speed ranges and turning directions.

In other words, during turning with the driving mode being the sports mode, the rotating direction of each variable flap 20 corresponding to the left front wheel, the right front wheel, the rear left wheel, and the right rear wheel is adjusted so that yaw moment is generated in the turning direction, thereby improving handling performance and securing driving stability.

The above is derived through experiment that shows the aerodynamic flow changes according to driving speed during turning. The experimental table evaluating the yaw moment (C_YM) contribution according to the suction flow or blowing flow depending on the rotational position of each variable flap 20 of the left front wheel (FL), the right front wheel (FR), the left rear wheel (RL), and the right rear wheel (RR) may be referred to.

| CASE | FL | FR | RL | RR | C_YM |
|---|---|---|---|---|---|
| 1 | Suction | Suction | Suction | Suction | 0.005 |
| 2 | Blowing | Blowing | Blowing | Blowing | 0.002 |
| 3 | Blowing | Suction | Blowing | Suction | −0.038 |
| 4 | Suction | Blowing | Suction | Blowing | 0.046 |
| 5 | Blowing | Suction | Suction | Blowing | −0.133 |

As can be seen from the above, since CASE 5 generates the largest yaw moment, the turning performance is improved even at low speed driving, and CASE 3 and CASE 4 can be applied optimally to the prevention of vehicle pulling and tire slip due to the centrifugal force at high speed driving.

Accordingly, when the driving speed is in a predetermined first speed range and the vehicle is turning left in the sports mode, the controller 50 may control such that the variable flap 20 of the left front wheel and the variable flap 20 of the right rear wheel are oriented to the first direction, the variable flap 20 of the right front wheel and the variable flap 20 of the left rear wheel are oriented to the second direction, and the rotation angles of all the variable flaps 20 are adjusted to the third predetermined angle. During right turn, each variable flap 20 may be adjusted to be rotated in the direction opposite to the case of left turn.

In other words, vehicle pulling is caused by inertia when the vehicle is turning at high speed in the sports mode, the rotating direction of the variable flap 20 may be set differently according to the driving speed in the sports mode.

Herein, the first speed range preset in the controller 50 may be set at a speed range of 80 KPH or less, which may be tuned according to vehicle design. As such, when left turn is performed in the sports mode within the first speed range, the variable flap 20 of the left front wheel and the variable flap 20 of the right rear wheel are rotated in the first direction so as to improve drag according to the suction flow of air, and the variable flap 20 of the right front wheel and the variable flap 20 of the left rear wheel are rotated in the second direction so as to improve lift according to the blowing flow of air.

On the contrary, when right turning is performed in the sports mode within the first speed range, the variable flap 20 of the left front wheel and the variable flap 20 of the right rear wheel may be rotated in the second direction, and the variable flap 20 of the right front wheel and the variable flap 20 of the left rear wheel may be rotated in the first direction.

Further, the rotation angles of the variable flap 20 of the front wheels and the variable flap 20 of the rear wheels are fixed to a third predetermined angle, thereby preventing tire slip due to the centrifugal force during turning at high speed driving. Herein, the third predetermined angle may be set at an angle of 35° in the first direction and set at an angle of −35° in the second direction.

When the driving speed is in a second speed range higher than the first speed range and the vehicle is turning left in the sports mode, the controller 50 may control such that the left front wheel, the left rear wheel, and the right rear wheel are oriented to the first direction, the right front wheel is oriented to the second direction, and the rotation angles of all the variable flaps 20 are adjusted to the third predetermined angle. During the right turn, each variable flap 20 may be adjusted to be rotated in the direction opposite to the case of left turn.

Herein, the second speed range preset in the controller 50 may be set at a speed range of 80 KPH to 120 KPH, which may be tuned according to vehicle design.

In particular, when the left turn is performed in the sports mode within the second speed range, the left front wheel, the left rear wheel, and the right rear wheel may be rotated to the first direction so as to form suction flow of air, and the right front wheel may be rotated to the second direction so as to form blowing flow of air, thereby securing turning performance in the second speed range.

On the contrary, when the right turn is performed in the sports mode within the second speed range, the right front wheel, the left rear wheel, and the right rear wheel may be rotated to the first direction, and the left front wheel may be rotated to the second direction.

Further, the rotation angles of the variable flap 20 of the front wheels and the variable flap 20 of the rear wheels are fixed to the third predetermined angle, thereby preventing tire slip due to the centrifugal force during turning at high speed driving.

Meanwhile, when the driving speed is in a third speed range higher than the second speed range and the vehicle is turning left in the sports mode, the controller 50 may control such that the variable flap 20 of the left front wheel and the variable flap 20 of the left rear wheel are oriented to the first direction, the variable flap 20 of the right front wheel and the variable flap 20 of the right rear wheel are oriented to the second direction, and the rotation angles of all the variable flaps 20 are adjusted to the third predetermined angle. During the right turn, each variable flap 20 may be adjusted to be rotated in the direction opposite to the case of left turn.

Herein, the third speed range preset in the controller 50 may be set at a speed range of more than 120 KPH, which may be tuned according to vehicle design.

In particular, when the left turn is performed in the sports mode within the third speed range, the variable flap 20 of the left front wheel and the variable flap 20 of the left rear wheel are rotated in the first direction to form suction flow of air, and the variable flap 20 of the right front wheel and the variable flap 20 of the right rear wheel are rotated in the second direction so as to form blowing flow of air, thereby securing turning performance optimized in the third speed range.

On the contrary, when the right turn is performed in the sports mode within the third speed range, the variable flap 20 of the right front wheel and the variable flap 20 of the right rear wheel may be rotated in the first direction, and the variable flap 20 of the left front wheel and the variable flap 20 of the left rear wheel may be rotated in the second direction, thereby forming blowing flow of air.

As described above, when the driving mode of the vehicle is the sports mode and the vehicle is turning, the rotation angles of the variable flaps 20 corresponding to the left front wheel, the right front wheel, the left rear wheel, and the right rear wheel are adjusted according to the driving speed of the vehicle, and as a result, turning performance and driving stability are improved by generating yaw moment according to turning direction.

According to the variable aerodynamic wheel and the control system thereof configured as described above, the variable flap 20 is applied between spokes of a wheel, so that air can be sucked or blown depending on the angle of the variable flap 20, whereby air resistance is reduced and also a shape of wake flowing on the vehicle body is optimized, so drag and lift are improved, and thus driving performance and fuel efficiency are improved.

Although the disclosure is described with reference to specific items such as specific structural elements, to merely some embodiments, and to drawings, such specific details disclosed herein are merely representative for purposes of helping more comprehensive understanding of the present disclosure. The present disclosure, however, is not limited to only the example embodiments set forth herein, and those skilled in the art will appreciate that the present disclosure can be embodied in many alternate forms.

What is claimed is:

1. A variable aerodynamic wheel comprising:
    a spoke wheel having:
    a plurality of spokes connecting a hub and a rim together are spaced apart from each other; and
    a plurality of through spaces defined between the plurality of spokes to allow air to pass therethrough;
    a variable flap rotatably disposed in the plurality of through spaces of the spoke wheel, and configured in a shape to cover an associated through space so as to open or close the associated through space according to a rotation angle of the variable flap; and
    a drive unit disposed in the spoke wheel, and connected to the variable flap such that the rotation angle of the variable flap is adjusted as rotational power is transmitted.

2. The wheel of claim 1, wherein the variable flap includes fixing pins at first and second ends thereof, respectively, and
    wherein the fixing pin at the first end is rotatably connected to the rim and the fixing pin at the second end is rotatably connected to the hub.

3. The wheel of claim 1, wherein the drive unit includes:
    a rotary motor disposed in the hub, and having a drive gear for transmitting the rotational power;
    a ring gear configured to be rotatable about a center of the hub, extending in a circumferential direction of the hub, and engaged with the drive gear; and
    a transmission gear coupled to the variable flap, and engaged with the ring gear to be rotated along with the variable flap when the ring gear is rotated, thereby changing the rotation angle of the variable flap.

4. The wheel of claim 1, further comprising a power-generation cover unit disposed in the hub of the spoke wheel to cover the drive unit,
    wherein power-generation cover unit includes:
    a power-generating cover having a plate shape to cover the drive unit, fixedly mounted to the hub, and including a thermoelectric device that generates electrical energy using heat; and
    a battery disposed in the hub, and configured to store the electrical energy generated from the power-generating cover.

5. A control system of a variable aerodynamic wheel, the control system comprising:
    a plurality of spokes disposed in each of front and rear wheels, the plurality of spokes connecting a hub and a rim together and spaced apart from each other, and including a plurality of through spaces defined between the plurality of spokes to allow air to pass therethrough;
    a variable flap configured to be rotatable in the plurality of through spaces of the spoke wheels, and has a shape to cover an associated through space so as to open or close the associated through space according to a rotation angle of the variable flap;
    a drive unit disposed in the front and rear wheels, and connected to the variable flap such that the rotation angle of the variable flap is adjusted as rotational power is transmitted; and
    a controller receiving driving speed information and configured to control the drive unit to adjust the rotation angle of the variable flap and a rotating direction of the variable flap according to a driving speed of a vehicle.

6. The control system of claim 5, wherein a rotating direction of the variable flap preset in the controller is set to a first direction to allow air to flow into the through space during rotation of the front and rear wheels, and a second direction to allow air to be blown out from the through space.

7. The control system of claim 6, wherein when the driving speed of the vehicle is within a predetermined low speed range, the controller controls the drive unit to adjust the rotation angle of the variable flap such that the variable flap of each of the front and rear wheels fully open the plurality of through spaces.

8. The control system of claim 6, wherein the controller receives information according to a driving mode of the vehicle,
wherein, when the driving speed of the vehicle is within a predetermined high speed range, the controller controls the drive unit to adjust the rotation angle of the variable flap of each of the front and rear wheels, and
wherein the rotation angle of the variable flap is controlled such that variable flaps of the front and rear wheels are rotated in the first direction or in the second direction to fully close the through spaces or to partially open the plurality of through spaces according to the driving mode of the vehicle.

9. The control system of claim 8, wherein when the driving mode is a first mode, the controller adjusts rotation angles of the variable flaps such that the variable flaps of the front and rear wheels fully close the through spaces.

10. The control system of claim 8, wherein when the driving mode is an eco mode, the controller adjusts the rotation angles of the variable flaps such that the variable flap of each of the front and rear wheels has a first predetermined angle toward the first direction.

11. The control system of claim 10, wherein the first predetermined angle of the controller is set differently according to a plurality of driving speed ranges such that the rotation angle of the variable flap is incrementally decreased as the driving speed is increased.

12. The control system of claim 8, wherein the controller receives information according to whether the vehicle is turning or not, and during straight driving with the driving mode being a sports mode, the controller controls such that the variable flaps of the front wheels are oriented to the second direction, the variable flaps of the rear wheels are oriented to the first direction, and the rotation angles of all the variable flaps are adjusted to a second predetermined angle.

13. The control system of claim 12, wherein the second predetermined angle of the controller is set differently according to a plurality of driving speed ranges such that the rotation angle of the variable flap is incrementally decreased as the driving speed is increased.

14. The control system of claim 8, wherein during turning with the driving mode being a sports mode, a rotating direction of the variable flap corresponding to each of a left front wheel, a right front wheel, a left rear wheel, and a right rear wheel is changed according to a plurality of driving speed ranges and turning directions.

15. The control system of claim 14, wherein when the driving speed is in a predetermined first speed range and the vehicle is turning left in the sports mode, the variable flap of the left front wheel and the variable flap of the right rear wheel are oriented to the first direction, the variable flap of the right front wheel and the variable flap of the left rear wheel are oriented to the second direction, and the rotation angles of all the variable flaps are adjusted to a third predetermined angle, and
during right turning, each of the variable flaps is adjusted to be rotated in a direction opposite to left turning.

16. The control system of claim 15, wherein when the driving speed is in a second speed range higher than the first speed range and the vehicle is turning left in the sports mode, the left front wheel, the left rear wheel, and the right rear wheel are oriented to the first direction, the right front wheel is oriented to the second direction, and the rotation angles of all the variable flaps are adjusted to the third predetermined angle, and
during right turning, each of the variable flaps is adjusted to be rotated in a direction opposite to left turning.

17. The control system of claim 16, wherein when the driving speed is in a third speed range higher than the second speed range and the vehicle is turning left in the sports mode, the variable flap of the left front wheel and the variable flap of the left rear wheel are oriented to the first direction, the variable flap of the right front wheel and the variable flap of the right rear wheel are oriented to the second direction, and the rotation angles of all the variable flaps are adjusted to the third predetermined angle, and
during right turning, each of the variable flaps is adjusted to be rotated in a direction opposite to left turning.

* * * * *